United States Patent [19]
De Lena

[11] Patent Number: 5,466,037
[45] Date of Patent: Nov. 14, 1995

[54] MOVABLE TRANSPARENT PANEL STRUCTURE TO CLOSE THE ROOF OF AN AUTOMOBILE

[75] Inventor: Oscar De Lena, Termoli, Italy

[73] Assignee: Societa Italiana Vetro - SIV S.p.A., San Salvo CH, Italy

[21] Appl. No.: 97,204

[22] Filed: Jul. 27, 1993

[30] Foreign Application Priority Data

Jul. 28, 1992 [IT] Italy .................. RM92A0577

[51] Int. Cl.⁶ .................................................. B60J 7/00
[52] U.S. Cl. .................. 296/211; 276/216; 52/786.12; 428/34
[58] Field of Search .................. 296/211, 215, 296/218, 216, 96.14; 49/465, 463; 52/788, 789, 790; 428/34

[56] References Cited

U.S. PATENT DOCUMENTS

| | | | |
|---|---|---|---|
| 2,009,445 | 7/1935 | Gould | 296/215 X |
| 4,219,230 | 8/1980 | Lapine | 296/215 X |
| 4,226,063 | 10/1980 | Chenel | 52/788 X |
| 4,581,868 | 4/1986 | McCann | 428/34 X |
| 4,634,231 | 1/1987 | Poncelet et al. | 296/218 X |
| 4,645,259 | 2/1987 | Dufft | 296/218 X |
| 4,680,206 | 7/1987 | Yoxon et al. | 52/788 X |
| 5,033,249 | 7/1991 | Scheeren et al. | 296/96.14 |
| 5,120,584 | 6/1992 | Ohlenforst et al. | 52/788 X |
| 5,228,925 | 7/1993 | Nath et al. | 296/215 X |
| 5,391,411 | 2/1995 | Rowland et al. | 52/790 |

FOREIGN PATENT DOCUMENTS

| | | |
|---|---|---|
| 0076218 | 4/1983 | European Pat. Off. . |
| 0238164 | 9/1987 | European Pat. Off. . |
| 0307280 | 3/1989 | European Pat. Off. . |
| 0411879 | 2/1991 | European Pat. Off. . |
| 1321378 | 2/1963 | France .................. 52/786.13 |
| 3017216 | 11/1981 | Germany ............... 296/96.14 |
| 634222 | 2/1962 | Italy .................. 296/216 |
| 0063419 | 3/1989 | Japan .................. 296/211 |
| 1585140 | 2/1981 | United Kingdom .......... 296/216 |
| 2227431 | 8/1990 | United Kingdom .......... 296/215 |

Primary Examiner—Dennis H. Pedder
Attorney, Agent, or Firm—Wenderoth, Lind & Ponack

[57] ABSTRACT

A panel of glass or other transparent sheet material for use as a transparent sun roof for automobiles has a double-glazed structure formed by two sheets and a gap therebetween. A sealing bead holds the sheets together at a desired distance from each other. The holes through which the elements for fixing the sun roof to the roof of the vehicle extend are provided in only one of the sheets and to the outside of the gap between the sheets.

1 Claim, 2 Drawing Sheets

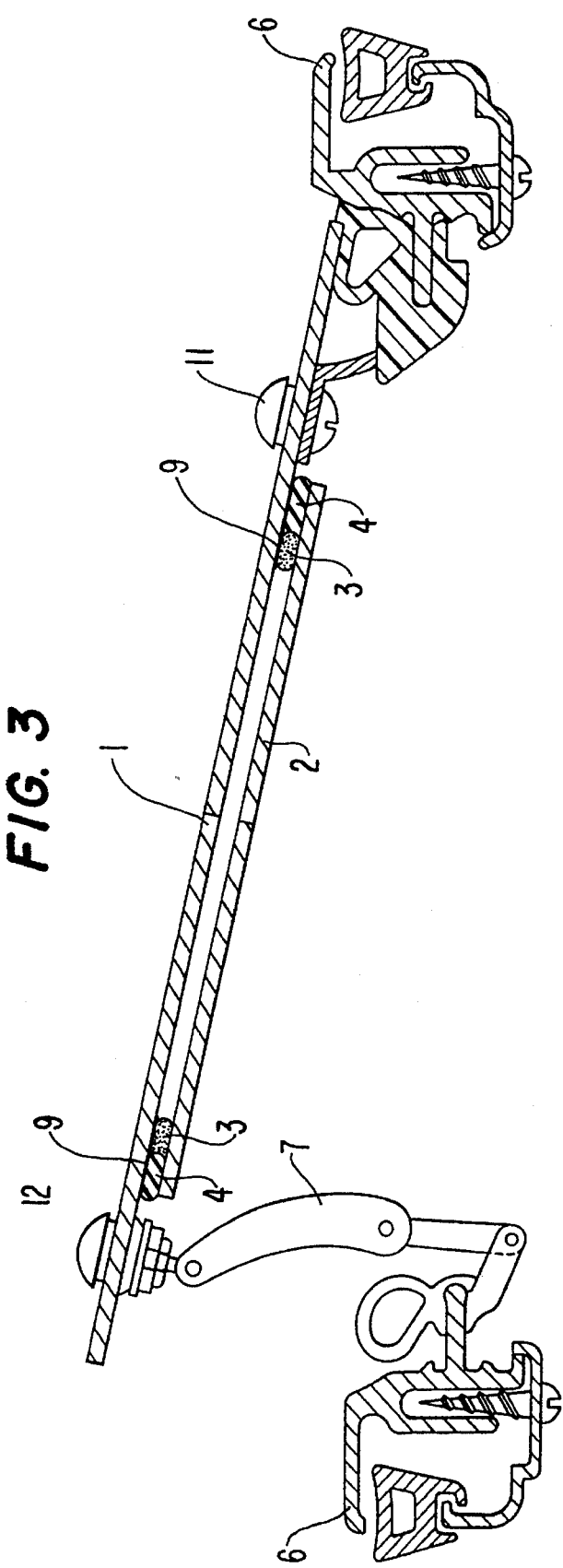

MOVABLE TRANSPARENT PANEL STRUCTURE TO CLOSE THE ROOF OF AN AUTOMOBILE

BACKGROUND OF THE INVENTION

1. Field of the Invention

The present invention relates to a panel for automobiles, and in particular to a panel made of glass or transparent plastic material.

2. Description of the Prior Art

A panel of this type is commonly known as a sun roof, and for preference replaces that part of the metal roof above the front seats.

The panel is made of glass or other transparent material and has a light and energy transmission factor not exceeding 25% of the incident energy, so as to prevent unpleasant irradiation of the inside of the vehicle. That is, the light and energy transmission factor is a measure of the amount of light or energy directly transmitted through the glass.

In order to obtain the above light and energy transmission factor, sun roofs are generally made of glass having a thickness of between 3 and 5 mm, provided with suitable silk-screen coatings and/or thin reflective layers.

These sun roofs make it possible to increase the comfort level inside automobiles, particularly during the hotter months of the year, thanks to the improved circulation of air within the interior of the vehicle.

However, there are certain problems during the colder months of the year, when the high level of humidity and the cold outside cause mist to form on the inner surface of the sun roof. Furthermore, the difference in temperature between the inside and the outside of the vehicle generates an unpleasant coldness at the level of the occupants' heads.

In order to overcome the above problems, sliding false roofs made of the same materials as the inside upholstery are at present installed in the roofs of automobiles, which act as a screen separating the transparent sun roof from the rest of the interior during the colder months.

The use of such false roofs is sometimes advisable even during summer months, in particular in the presence of extremely strong sunshine.

It can be appreciated that the production and assembly of these false roofs gives rise to additional manufacturing costs.

SUMMARY OF THE INVENTION

An object of the present invention is, therefore, to eliminate the need for a false roof, thus reducing the overall manufacturing costs of an automobile provided with an openable sun roof.

A further object of the present invention is to provide a transparent sun roof having characteristics which contribute to an improved comfort level for passengers during both the winter and the summer months.

In order to attain these objects, the transparent sun roof is made of a double-glazed structure, using two sheets of glass separated by a gap which is carefully sealed so as to prevent humidity from entering between the sheets of glass.

Furthermore, the sun roof preferably has reflecting and/or opaque layers on one or more of its surfaces so as to provide extremely low transmission levels.

The sun roof also has structural elements by which it is anchored to the metal structure of the automobile which, on the one hand, guarantees the best possible seal against the entry of external currents of air into the interior of the vehicle and, on the other hand, maintains the insulation characteristics.

These objects are achieved by a sun roof of the invention assembled in an aperture of the roof structure of a vehicle that comprises:

an external sheet and an internal sheet disposed face-to-face at a predetermined distance from each other so as to define a gap therebetween, assembly holes being provided in one of the sheets;

a continuous adhesive bead in contact with the external and internal sheets and extending substantially along the edge thereof, the bead defining the gap, holding the sheets together and spacing the sheets by the predetermined distance, the assembly holes being located opposite the gap with respect to the bead; and mechanical assembly elements extending through the assembly holes for use in fixing the sun roof to the roof of the vehicle.

Accordingly, the aperture in the roof is closed by a double-glazed structure.

Moreover, the sheets can also be surface treated so as to control the transmission of luminous and/or thermic energy therethrough.

The present invention provides the following advantages: an increased comfort level within the vehicle during both the warmer months and the colder ones, increased passive safety with respect to sun roofs made of a single sheet of glass, the elimination of mist on the surface closest to the heads of the occupants, the possibility of obtaining with greater versatility a number of characteristics using different surface treatments on the four surfaces of the two sheets of glass available (in contrast, only two surfaces, an internal and an external one, are available in sun roofs made of glass according to the prior art), a decrease in noise, and the elimination of the protective false roof.

BRIEF DESCRIPTION OF THE DRAWINGS

Further advantages and characteristics of the invention will be evident from the following description, given merely as a non-limiting example with reference to the accompanying drawings, in which:

FIG. 3 is a similar cross-sectional view of an alternative embodiment of the sun roof according to the present invention.

DETAILED DESCRIPTION OF THE PREFERRED EMBODIMENTS

Figure 1:
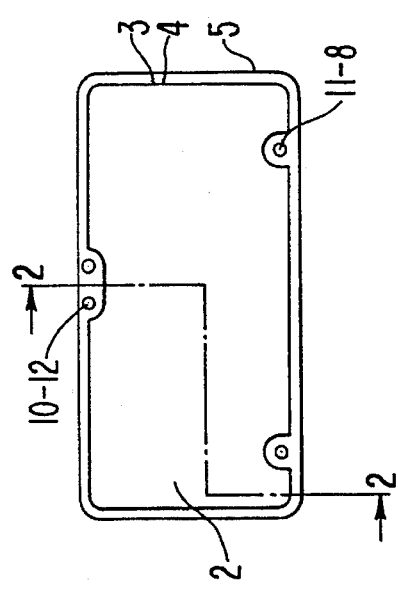
FIG. 1 is a top view of a sun roof according to the present invention.

A sun roof according to the present invention has a double-glazed structure formed by a sheet of glass 1 held together with another sheet of glass 2 by means of a bead 3 which can be made, for example, of butyl rubber. As an example, the butyl rubber produced by the company CHEMETALL can be used, which is also capable of absorbing the humidity in the gap between the two sheets of glass, thanks to special absorbent elements present in the butyl mixture.

An external seal 4 comprises a polysulphide resin, for example M 82 also produced by CHEMETALL.

An opaque layer 9 is placed along the edge of the internal face of the external sheet 1 in such a way as to protect the beads of adhesive and/or sealant from ultraviolet rays, which could in the long term compromise their mechanical characteristics.

Figure 2:
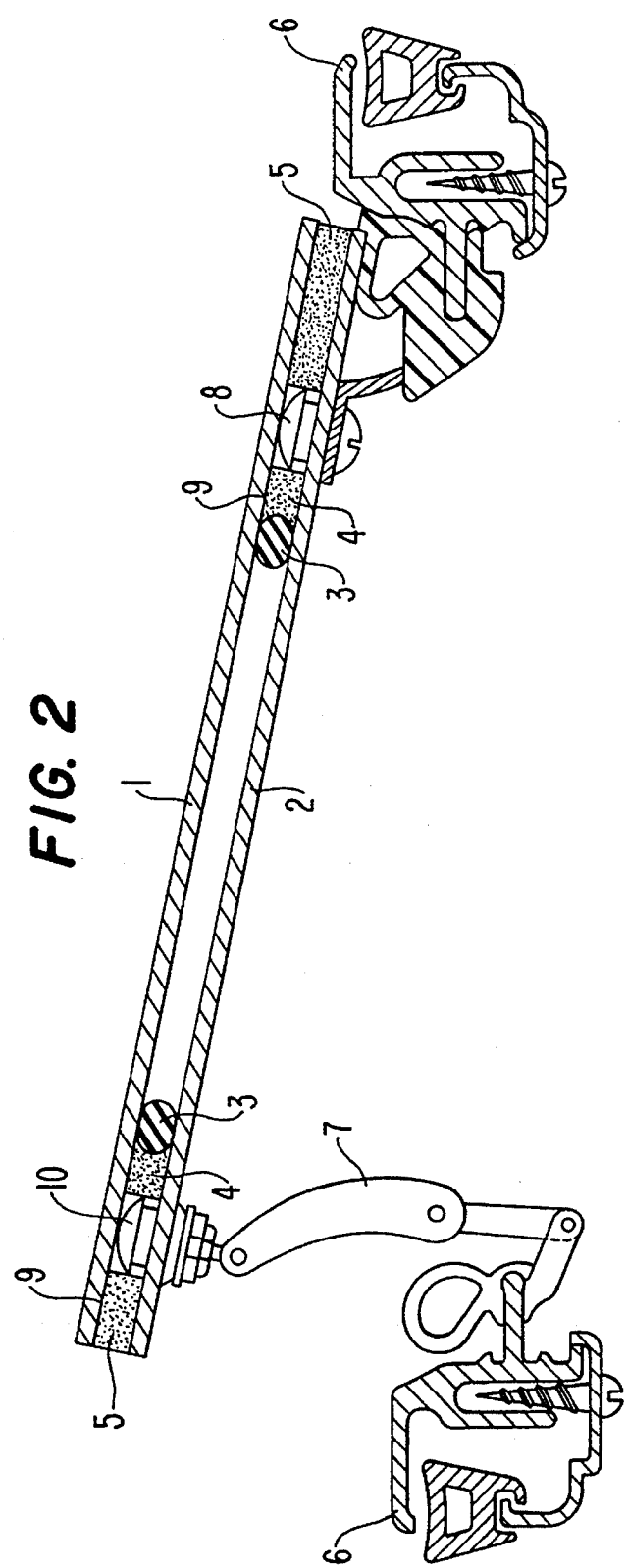
FIG. 2 is a cross-sectional view of a sun roof according to the present invention taken along line 2—2 of FIG. 1.

With reference to FIG. 2, the two sheets of glass 1 and 2 have the same shape and the same perimeters.

As can be seen from FIG. 1, the adhesive bead 3 and seal 4 run substantially along the edge of the sheets of glass, and to the outside (with respect to the gap) of which bead and seal holes are formed in the internal sheet, as illustrated in FIG. 2. These holes serve to receive the elements for assembling the transparent panel to the structure of the roof of the automobile.

Screws 8 connect the sheet of glass 2 to hinges (not illustrated) for fixing the sun roof to a support structure formed from a group of known structural elements generally indicated by reference 6. Other screws 10 connect the sheet of glass 2 to a handle 7 which serves to raise the sun roof from the roof of the vehicle and to rotate it around the hinges (not illustrated).

A further bead of sealing adhesive 5 is used to seal the screws 8 and 10 from the outside.

The sun roof as described above represents an improvement in the air penetration coefficient of the vehicle, as there are no parts exposed to the outside, given that the screws 8, 10 are situated below the external sheet 1.

With reference to FIG. 3, which shows an alternative embodiment of the invention, the sun roof is formed by the assembly of two sheets of glass having the same shape but different sizes. In particular the internal sheet 2 is smaller than the external sheet 1. In this case, the sun roof is secured to the supporting structure by screws 11 which connect the external sheet only to the hinges (not illustrated) and by screws 12 which again connect the external sheet of glass to the handle 7.

This sun roof has the advantage that no significant modifications have to be made to the fixed structure forming the opening.

The above description refers to a sun roof which is preferably hinged along one of its two long sides and is movable along the other long side. However, the present invention can also be applied to horizontally movable or even completely removable sun roofs. Furthermore the present invention can also be applied to flat or curved sheets of glass.

In order to improve the comfort provided by sun roofs according to the present invention, the surfaces of one or both of the sheets of glass defining the gap can be coated with thin reflecting or low-emission layers using physical or chemical deposition techniques. In the case of a double-glazed sun roof, the two inner surfaces between which the gap is defined can be coated with two thin layers, respectively, having different characteristics which, when combined, allow desired thermal insulation values to be obtained. This has not been possible up to now using sun roofs made of a single layer of glass.

Furthermore, a neutral gas such as argon can be provided in the gap, thus increasing the thermal insulation characteristics and in particular reducing the value of the thermal transmission coefficient.

The following illustrates the results obtained by means of a double-glazed sun roof according to the present invention, when compared with the results obtained with a sun roof according to the prior art.

It is known from the prior art that the comfort obtained with a sun roof can be measured with the aid of certain coefficients. In particular, comfort during the winter can be measured using the thermal transmission coefficient K expressed in $W/m^{2\circ}$ C., whereas summer comfort can be measured using the solar factor SF expressed in % of incident energy, while the proclivity of mist to be produced on the glass is measured using the relative humidity coefficient RH.

The best comfort is obtained in conditions where SF and K are low, and RH is high.

In the following table, given merely as an example, the following have been compared:

1) a sun roof comprising a single sheet of clear glass with a thickness of 3 mm coated with a thin reflecting layer;
2) A double-glazed sun roof comprising one sheet of clear glass having a thickness of 3 mm coated on the inside with a thin reflecting layer, a gap (interspace) of 3 mm, and another sheet of clear glass having a thickness of 3 mm;
3) A sun roof comprising one sheet of clear glass having a thickness of 3 mm coated on the inside with a thin reflecting layer, a gap of 3 mm, and another sheet of clear glass having a thickness of 3 mm coated with another thin reflecting layer.

The following values are the results of experimental tests conducted with a sun roof on a car in movement:

|  | TL | TE | K $W/m^2$ °C. | SF | RH |
| --- | --- | --- | --- | --- | --- |
| Glass 1 | 10% | 7% | 8.6 | 11% | 29% |
| Glass 2 | 9% | 6% | 4.6 | 8% | 53% |
| Glass 3 | 9% | 5% | 4.3 | 7% | 55% |

It can thus be seen that a sun roof of a double-glazed structure greatly improves the comfort of a passenger of a vehicle.

In addition to or as an alternative to the thin reflecting layers, inks or opaque enamels can be applied to one of the surfaces of the two sheets by, for example, silk-screen processes. In this case the materials can be applied in various kinds of patterns, such as a checked pattern of varying fineness in which opaque squares or dots alternate with transparent squares or dots to form known geometrical figures, for example diamonds and the like.

I claim:

1. A panel for assembly into an aperture in the roof of a vehicle so as to be capable of closing and opening the aperture, said panel comprising:

a double-glazed structure including external and internal sheets of transparent material confronting and spaced a predetermined distance from each other so as to define a gap therebetween, said internal and external sheets having substantially the same outer perimeter;

of said internal and external sheets, only said internal sheet having assembly holes therethrough;

a continuous adhesive bead contacting said external and internal sheets and extending along the edge of said double-glazed structure, said bead delimiting the gap of said double-glazed structure, said bead holding said sheets together and said bead spacing said sheets by said predetermined distance, said assembly holes being provided on the opposite side of said bead with respect to said gap;

mechanical assembly elements extending through said assembly holes and mounted to said internal sheet for use in fixing the panel to the roof of the vehicle, whereby said mechanical elements will connect the internal sheet to the roof of the vehicle; and a bead of sealing adhesive contacting said external and said internal sheets, said sealing adhesive being provided on the opposite side of said assembly holes with respect to said adhesive bead, and said sealing adhesive sealing portions of said assembly elements extending between said sheets from the environment outside the double-glazed structure.

* * * * *